United States Patent [19]

Dickerhof

[11] Patent Number: 4,940,841

[45] Date of Patent: Jul. 10, 1990

[54] AQUEOUS TWO-COMPONENT PAINTS FOR ONE-COATING OF HIGH-RESISTANT FINISHING SHEETING AND CONTINUOUS EDGING

[75] Inventor: Karl-Heinz Dickerhof, Drensteinfurt, Fed. Rep. of Germany

[73] Assignee: BASF Lacke & Farben Aktiengesellschaft, Munster, Fed. Rep. of Germany

[21] Appl. No.: 382,689

[22] PCT Filed: Feb. 18, 1988

[86] PCT No.: PCT/EP88/00117

§ 371 Date: Aug. 16, 1989

§ 102(e) Date: Aug. 16, 1989

[87] PCT Pub. No.: WO88/06176

PCT Pub. Date: Aug. 25, 1988

[30] Foreign Application Priority Data

Feb. 19, 1987 [DE] Fed. Rep. of Germany ....... 3705255

[51] Int. Cl.$^5$ ............................................. C08L 61/00
[52] U.S. Cl. ................................... 524/510; 524/512; 525/155
[58] Field of Search .................. 524/510, 511, 512; 525/154, 155, 398

[56] References Cited

FOREIGN PATENT DOCUMENTS 1014677 12/1965 United Kingdom .
1178903 1/1970 United Kingdom .

Primary Examiner—Joseph L. Schofer
Assistant Examiner—Jeffrey T. Smith
Attorney, Agent, or Firm—Kenyon & Kenyon

[57] ABSTRACT

The invention relates to aqueous two-component paints containing customary additives and, if appropriate, pigments, for one-coat coating of finishing sheeting and continuous edging, characterized in that the paints containing as paint component (I)

(A) 40 to 85% by weight, preferably 60 to 85% by weight, of an aqueous dispersion of a self-crosslinking polyacrylate resin, which contains as the groups capable of bringing about the self-crosslinking acid amide derivative groups corresponding to the general structural formula

—CO—N($R^1$)—CH($R^2$)—$OR^3$, wherein $R^1$ = a hydrogen atom or a —CH($R^2$)—$OR^3$ group, $R^2$ = a hydrogen atom or a —$COOR^4$ group, $R^3$ = a hydrogen atom or a hydrocarbon radical of 1 to 10 carbon atoms, preferably the methyl, ethyl, (iso)propyl or (iso)butyl radical, $R^4$ = an alkyl radical of 1 to 5 carbon atoms;

(B) 5 to 50% by weight, preferably 7 to 20% by weight, of a melamine resin dispersed or dissolved in an aqueous medium (C) 0 to 40% by weight, preferably 5 to 20% by weight, of a urea resin dispersed or dissolved in an aqueous medium;

(D) 5 to 30% by weight, preferably 6 to 15% by weight, of a polyol component; and (E) 0.01 to 5% by weight, preferably 0.1 to 1.5% by weight, of an amine component, (A) to (E) adding up to 100% by weight; the curing component (II) consists of a water-dilutable acid and the components (I) and (II) are mixed prior to application in a ratio of 0.05 to 3 parts by weight, preferably 0.05 to 2 parts by weight, of the pure curing component (II) to 100 parts by weight of the paint component (I).

The invention further relates to a process for producing two-component paints as well as to their use for coating finishing sheeting and continuous edging.

20 Claims, No Drawings

AQUEOUS TWO-COMPONENT PAINTS FOR ONE-COATING OF HIGH-RESISTANT FINISHING SHEETING AND CONTINUOUS EDGING

The invention relates to aqueous two-component paints containing customary additives and, if appropriate, pigments, mainly for one-coat coating of high-resistant finishing sheeting and continuous edging.

At the present time there is a great gap within the field of surface materials between the laminates employed for coating chipboard or other boards made from cellulose fiber products and the finishing sheeting.

Impregnated paper which when pressed onto boards represents a pretreatment in the sense of a priming coat or[sic] frequently also displays a decorative effect decorative sheeting), has been known to the furniture and board industry for a long time. The scarcity and increased costs of genuine veneers has contributed to a quite significant degree to the increase in utilization of such a sheeting. After being pressed onto chipboard or hardboard the sheeting must be painted, since otherwise the surface effect is inadequate.

In an effort to simplify production, an improved version of impregnated paper, the finishing sheeting, has been gaining more and more in importance. This is an impregnated self-colored or printed paper sheeting which may be provided with a coating of paint already by the sheeting manufacturer as a follow-up to impregnation.

The finishing sheeting and continuous edging (for continuous coating of edges) thus obtained are supplied in the form of rolls to the furniture and board industries where they are glued to the substrates, such as, for example, chipboard or hardboard, under the influence of pressure and heat. Surfaces are obtained in this manner which usually do not require further painting, in other words they can be further processed "straight from the press".

The paints used for painting the finishing sheeting and continuous edging under discussion and the coatings produced from the paints must do justice to stringent demands.

Thus no organic solvents and/or formaldehyde, or only small amounts of these, should be evolved during the coating of the finishing sheeting and continuous edging and in further processing of the coated sheeting and edging.

Furthermore, it is desirable that the printed but not yet pressed-on sheeting does not curl, let alone coil.

It is of particular importance that the paints used for coating the finishing sheeting and continuous edging should achieve, after being heat-treated for less than 60 seconds, usually 10 to 20 seconds, at 140° to 210° C., such a degree of curing that they survive the press conditions used in the production of boards and furniture components (for example 5 to 30 seconds at 150° to 180° C. and 5 to 20 kp/cm²; more severe press conditions up to 180 seconds at 170° to 180° C. and up to 30 kp/cm²) unimpaired without showing blocking characteristics or discoloration. The surfaces obtained in this manner would be expected to possess an abrasion resistance as high as possible and attain the resistance values required for group A of DIN 68861.

Group A of DIN 68861 specifies the following requirements for the surfaces under test:

| Testing agent | DA | R |
|---|---|---|
| 1 Acetic acid | 16 h | 0 |
| 2 Citric acid | 16 h | 0 |
| 3 Sodium carbonate | 16 h | 0 |
| 4 Ammonia water | 16 h | 0 |
| 5 Ethyl alcohol | 16 h | 0 |
| 6 White, red and southern wines | 16 h | 0 |
| 7 Beer | 16 h | 0 |
| 8 Cola beverages | 16 h | 0 |
| 9 Instant coffee | 16 h | 0 |
| 10 Black tea | 16 h | 0 |
| 11 Blackcurrants | 16 h | 0 |
| 12 Condensed milk | 16 h | 0 |
| 13 Water | 16 h | 0 |
| 14 Gasoline | 16 h | 0 |
| 15 Acetone | 16 h | 0 |
| 16 Ethyl butyl acetate | 16 h | 0 |
| 17 Butter | 16 h | 0 |
| 18 Olive oil | 16 h | 0 |
| 19 Mustard | 16 h | 0 |
| 20 Kitchen salt | 16 h | 0 |
| 21 Onion | 16 h | 0 |
| 22 Lipstick | 16 h | 0 |
| 23 Disinfectants | 16 h | 0 |
| 24 Black ballpen ink | 16 h | 0 |
| 25 Rubber stamp ink | 16 h | 0 |
| 26 Cleansing agents | 16 h | 0 |
| 27 Cleansing solution | 16 h | 0 |

DA = duration of action by the testing agent
R = results

Description of results

From a comparative observation of the tested and untested areas, the result of the test is to be given in the form of the following rating scale:
0 no visible changes
1 barely detectable changes in gloss or color
2 slight changes in gloss or color; the structure of the test area is unaltered
3 heavy marking detectable, but the structure of the test area remains largely unimpaired
4 heavy marking detectable; the structure of the test area is altered
5 test area severely altered or broken down.

A test which is carried out especially in order to test whether the special requirements of the Scandinavian or American markets are complied with, is the so-called swelling test or water test. This test is carried out in such a way that a water column of about 100 cm³ is allowed to act for 24 hours on the painted surface without any swelling being detectable. No marking should likewise remain by the action of instant coffee and mustard over 24 hours.

The requirements for low solvent emission referred to earlier can only be met by aqueous systems.

In order to produce surfaces exhibiting high abrasion resistance and attaining the resistance values required for group A of DIN 68861, paints have been hitherto employed which contain as principal binder either melamine and/or urea resins or polyacrylates.

Paints based on melamine and/or urea resins possess the shortcoming of being readily swelled by water and aqueous solutions; they also evolve during or after processing relatively high amounts of formaldehyde, and the sheeting coated by these paints has a marked tendency to curling and coiling.

Polyacrylate-based paints, known hitherto, possess poor abrasion resistance and poor resistance to solvents (in particular to acetone).

Known aqueous paint systems consisting of combinations of melamine and/or urea resins with polyacrylates have either a low solids content, an excessive emission of formaldehyde (greater than 0.1 ppm) or inadequate surface resistance to mechanical or chemical attack.

The present invention has the object of making available novel aqueous paints which are either low in, or free from, solvents, and low in formaldehyde, mainly for one-coat coating of high-resistant finishing sheeting and continuous edging. Paints low in formaldehyde are to be understood to be those which, after being applied to a sheeting or edging and after being glued to chipboard, meet emission class E 1, i.e. they evolve 0.1 ppm or less of formaldehyde. The preparation of the test specimen and the measuring procedure are described in DIN 52 368. The novel paints should achieve, after being heat-treated at 140° to 210° C. for not more than 60 seconds, usually 10 to 20 seconds, such a degree of curing that they survive the press conditions used in the production of boards and furniture components—in particular the more severe press conditions used increasingly—unimpaired without showing blocking characteristics or discoloration. The surfaces obtained in this manner should possess an abrasion resistance as high as possible. The resistance valves required for group A of DIN 68 861 should be attained and as far as possible the swelling test described above, should also be met.

The novel paints should further evolve as little formaldehyde as possible both during the coating of the sheeting and continuous edging and during further processing of the coated sheeting and continuous edging.

Finally, the novel paints should not cause, after being applied, the sheeting to curl, let alone coil.

"Thermosetting Acrylic Emulsion" (Talak, Pontis, Paint & Resin 1983, Vol. 53, No. 6, 34 ff.) (1) describes unpigmented one-component coating compositions which consist essentially of aqueous emulsions of polyacrylates containing carboxyl, hydroxyl or methylolamide groups, of hexamethoxymethylmelamine, ammonium p-toluenesulfonate as the blocked curing catalyst and butyl cellusolve [sic].

The aqueous coating compositions described in (1) are said to be suitable for a whole range of applications including coating of paper. Attempts to use the coating compositions described in (1) for coating finishing sheeting and continuous edging under the conditions described above, produced only unsatisfactory results.

Pressing of sheeting coated with the paints described in (1) led to surfaces which produced very poor results in tests in particular with red wine, instant coffee and black tea (compare also findings relating to group A of DIN 68861).

DE-OS No. 2,135,072 recommends a process for producing high-gloss decorative paper surfaces, wherein a decorative raw paper is saturated or coated with a filler-free mixture of a thermoplastic and a self-crosslinking aqueous acrylate-based dispersion which may also contain a water-soluble melamine-formaldehyde or urea-formaldehyde resin, subsequently dried and calendered with a roll polished to high gloss at a temperature between 120° and 180° C.

Attempts to employ the coating compositions disclosed in DE-OS No. 2,135,072 for coating of finishing sheeting and continuous edging under the above conditions, produced only unsatisfactory results: the resultant surfaces possess poor abrasion characteristics and adhere during pressing to the plate of the press or the mylar belt.

The object forming the basis of the present invention could be surprisingly achieved by preparing two-component paints of the type mentioned at the outset, which contain as paint component (I)

(A) 40 to 85% by weight, preferably 60 to 85% by weight, of an aqueous dispersion of a self-crosslinking polyacrylate resin which contains as the groups capable of bringing about the self-crosslinking acid amide derivative groups corresponding to the general structural formula

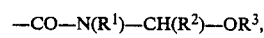

$$—CO—N(R^1)—CH(R^2)—OR^3,$$

wherein
$R^1 =$ a hydrogen atom or a $—CH(R^2)—OR^3$ group,
$R^2 =$ a hydrogen atom or a $—COOR^4$ group,
$R^3 =$ a hydrogen atom or a hydrocarbon radical of 1 to 10 carbon atoms, preferably the methyl, ethyl, (iso)propyl or (iso)butyl radical,
$R^4 =$ an alkyl radical of 1 to 5 carbon atoms;

(B) 5 to 50% by weight, preferably 7 to 20% by weight, of a melamine resin dispersed or dissolved in an aqueous medium;

(C) 0 to 40% by weight, preferably 5 to 20% by weight, of a urea resin dispersed or dissolved in an aqueous medium;

(D) 5 to 30% by weight, preferably 6 to 15% by weight, of a polyol component; and (E) 0.01 to 5% by weight, preferably 0.1 to 1.5% by weight, of an amine component, (A) to (E) adding up to 100% by weight; the curing component (II) consists of a water-dilutable acid and the components (I) and (II) are mixed prior to application in a ratio of 0.05 to 3 parts by weight, preferably 0.5 to 2 parts by weight, of the pure curing component (II) to 100 parts by weight of the paint component (I).

The coreactants (A), (B), (C) and (D) are mixed in a ratio of 0.1 to 0.7, preferably 0.2 to 0.5 parts by weight of the melamine resin (B), 0 to 0.7, preferably 0.01 to 0.4 parts by weight of the urea resin (C) and 0.01 to 0.7, preferably 0.01 to 0.4 parts by weight of the polyol component (D) to 1 part by weight of the self-crosslinking polyacrylate resin (A), based on the solids content.

Suitable water-dilutable acids are phosphoric acid, maleic acid, hydrochloric acid, p-toluenesulfonic acid and its derivatives as well as naphthalenesulfonic acid and its derivatives. p-Toluenesulfonic acid, for example in the form of a 50% aqueous solution, is preferred.

An aqueous paint is to be understood to be a paint which has at least 95% by weight, preferably 98 to 100% by weight, of water based on the total of all liquid diluents, as the liquid diluent. The paint may also additionally contain organic solvents, such as, for example, heterocyclic or aliphatic hydrocarbons, monohydric or polyhydric alcohols, ethers, esters and ketones, such as, for example, N-methylpyrrolidone, butanol, isopropanol, ethanol, ethyl glycol and butyl glycol as well as their acetates, butyl diglycol, ethylene glycol dibutyl ether, ethylene glycol diethyl ether, diethylene glycol dimethyl ether, cyclohexanone, methyl ethyl ketone, acetone, isophorone, propylene glycol or mixtures thereof.

Examples of conventional additives which the components of the paints according to the invention may contain, are: matting agents (silicic acid derivatives, waxes ... ), flowout and wetting agents (sodium polyacrylates ... ), emulsifiers (ethoxylated alkylphenols, ethoxylated fatty acids ... ), antifoams, plasticizers (ethoxylated glycerol ...), waxes, thixotropy agents (polyacrylates, polyurethanes, cellulose derivatives ...) and film-formers (phosphoric acid esters, glycols ...).

The paints according to the invention are two-component systems, comprising the paint component (I) and the curing component (II). Separately the two components have a shelf life of more than 6 months.

The pH and the proportions of coreactants in the mix have a crucial influence on the shelf life of the component (I). The pH should be above 7.

The two components (I) and (II) are mixed prior to application, the pot life of the resultant mix at room temperature depending critically on the pH and the proportions of the coreactants.

The manner of operation by the sheeting manufacturers requires the pot lives of mixes consisting of the components (I) and (II) to be longer than 24 hours.

Good coating results and adequate pot lives (these being understood to be pot lives at room temperature from 1 day to several weeks) can be attained when the individual components are reacted in a ratio of 0.1 to 0.7, preferably 0.2 to 0.5 parts by weight of the melamine resin (B), 0 to 0.7, preferably 0 to 0.4 parts by weight of the urea resin (C) and 0.01 to 0.7, preferably 0.01 to 0.4 parts by weight of the polyol component (D) to 1 part by weight of the self-crosslinking polyacrylate resin (A).

As soon as the mix of the paint component (I) and the curing component (II) has been applied and brought to a temperature from 140° to 210° C., it achieves within 10 to 55 seconds, usually within 10 to 20 seconds, and without bubble formation, such a degree of curing that the resultant paint surfaces survive further processing stages—in particular the more severe press conditions used increasingly—unimpaired without showing blocking characteristics or discoloration.

It is an advantage of the paint systems according to the invention that they produce surfaces with satisfactory properties even when the more severe press conditions have been used.

The surfaces produced by the paint systems according to the invention thus exhibit in particular high abrasion resistance values, good solvent resistance (particularly good resistance values to acetone) and very low formaldehyde emission values (less than 0.1 ppm in accordance with DIN 52 368; this corresponds to <3.5 mg/hm$^2$).

In addition, the coatings produced by the paints according to the invention meet almost all the requirements specified in Group A of DIN 68861 referred to above. It should be particularly stressed that surfaces produced by the paints according to the invention are absolutely free from any swelling phenomena and exhibit particularly good resistance to instant coffee and mustard. The paints according to the invention thus comply with the requirements of the Scandinavian and American markets in particular.

The paint component (I) contains 0.01 to 5% by weight, preferably 0.1 to 1.5% by weight, of an amine component. The amine addition not only ensures the shelf life of melamine resins in conjunction with the self-crosslinking polyacrylates, but also neutralizes some of the water-dilutable acid added as catalytic component (II). This allows the length of the pot life of the products and curing to be regulated.

Ammonia, triethylamine, dimethyl- or diethylaminoethanol, 2-amino-2-methylpropanol, 2-dimethylamino-2-methylpropanol, 2-amino-2-ethyl-1,3-propanediol or 2-amino-2-hydroxymethyl-1,3-propanediol can be used as the amine component (E).

Surprisingly, it is possible to obtain surfaces with particularly good resistance values which are particularly resistant to yellowing, when 2-amino-2-ethyl-1,3-propanediol and/or 2-amino-2-methylpropanol are used as the amine component.

Aqueous dispersions of self-crosslinking polyacrylate resins used as self-crosslinking, aqueous polyacrylate dispersions (A) contains [sic] as the groups making self-crosslinking possible acid amide derivative groups corresponding to the general structural formula —CO—N(R$^1$)CH(R$^2$)—OR$^3$, wherein $R^1$ = a hydrogen atom or a —CH(R$^2$)—OR$^3$ group,
$R^2$ = a hydrogen atom or a —COOR$^4$ group,
$R^3$ = a hydrogen atom or a hydrocarbon radical of 1 to 10 carbon atoms, preferably the methyl, ethyl, (iso)propyl or (iso)butyl radical,
$R^4$ = an alkyl radical of 1 to 5 carbon atoms.

The —CO—N(R$^1$)—CH(R$^2$)—OR$^3$ groups can be introduced into the polyacrylate molecule either via a monomer which is subsequently polymerized or via a reaction analogous to polymerization. —CO—N(R$^1$)—CH(R$^2$)-OR$^3$ groups in which $R^1$ and $R^2$ denote hydrogen atoms and $R^3$ a hydrogen atom or an alkyl radical of 1 to 4 carbon atoms, preferably methyl, ethyl, (iso)propyl or (iso)butyl, are preferred.

In addition to the acid amide derivative groups described above, the self-crosslinking polyacrylate resins may also contain carboxyl groups. However, the carboxyl group content of the self-crosslinking polyacrylate resin must not be so high that the polyacrylate resin dissolves when neutralized by the amine component.

A person skilled in the art can establish with the aid of a few orientation experiments what carboxyl group content to choose in each case for his particular problem area.

The polyacrylate resin to be used according to the invention can also contain, in addition to the acid amide derivatives and carboxyl groups, further functional groups, such as, for example, hydroxyl groups or free amide groups.

The aqueous dispersions to be used according to the invention can be prepared by generally known methods by copolymerization of (meth)acrylates, preferably methyl, ethyl, propyl or butyl (meth)acrylates, of the corresponding (meth)acrylic acid amide derivatives and, if desired, of monomers carrying a corresponding amount of carboxyl groups and containing a polymerizable double bond, for example fumaric or maleic acid, preferably (meth)acrylic acid, with the possibility of small amounts of further monomers, such as, for example, vinyl acetate, hydroxyalkyl (meth)acrylates, styrene, (meth)acrylic acid amides etc. being used at the same time.

Dispersions that are preferably used, have the following characteristics:
Solids: 40 to 60% by weight, preferably 40 to 50% by weight, based on the total weight of the aqueous polyacrylate dispersion.
Mean particle diameter: 0.1 to 0.5 μm, preferably 0.1 to 0.3 μm.
Minimum film-forming temperature (MFT): 0° to 70° C., preferably between 20° and 60° C.
Viscosity: 200 to 5,000 mPas, preferably 200 to 1,000 mPas and
pH: 2 to 10, preferably greater than 7.

The water-dilutable melamine resins (B) are generally known, usually etherified melamine-formaldehyde reaction products. Water dilutability of the melamine resins depends on, besides the degree of condensation which should be as low as possible, the etherification components, only the lowest members of the alkanol series giving rise to water-soluble condensates. Most important are the hexamethoxymethylmelamine resins. The use of solubilizers allows even melamine resins etherified with butanol to be dispersed in the aqueous phase.

Examples of melamine resins to be used according to the invention are the non-plasticized hexamethoxymethylmelamine resins available commercially under the brand names Cymel 300, 301, 303, Luwipal 068, 066, Beetle BE 3745 or Maprenal MF 900, 904 and 910.

The urea resins are the generally known water-diluting urea-formaldehyde reaction products.

Examples of urea resins to be used according to the invention are the plasticized or non-plasticized ureaformaldehyde reaction products commercially available under the brand names Dynomin UM 15, Resamin VHW 3525 or Plastopal.

Examples of the polyol component (D) are trihydric and higher-hydric alcohols, such as, for example, trimethylolpropane, ditrimethylolpropane, pentaerythritol, dipentaerythritol, trimethylolethane, glycerol, triethanolamine, mixed polymers obtained from polyethylene oxide and polypropylene oxide up to a molecular weight of 7,000, which must be water dilutable, ethoxylated and/or proposylated derivatives of trimethylolpropane and others, trishydroxyethylisocyanurate as well as hydroxyl groups-containing polyesters, consisting of low-molecular condensation products of adipic acid, maleic acid, phthalic acid and isophthalic acid with diethylene glycol, triethylene glycol, trimethylolpropane, butanediol, pentanediol and others.

Particularly good results are achieved when trihydric polyols are used. The use of diols gives rise to coatings with less satisfactory properties.

The paint systems according to the invention are also suitable for painting of wood substrates, such as, for example, hardboard, chipboard and wood materials. In many cases it may be advantageous to apply first a coat of primer. If particularly absorbent substrates are to be coated, a separate primer, for example a dispersion primer, should be applied first or two coats of the same paint should be applied.

The invention further relates to a process for one-coat coating of finishing sheeting and continuous edging, wherein the finishing sheeting and continuous edging are coated with an aqueous two-component paint containing customary additives and, if appropriate, pugments and wherein the wet film is subsequently cured for 10 to 60, preferably 10 to 20 seconds at 140° to 210° C., in which the two-component paint contains as paint component (I)

(A) 40 to 85% by weight, preferably 60 to 85% by weight, of an aqueous dispersion of a self-crosslinking polyacrylate resin which contains as the groups capable of bringing about the self-crosslinking acid amide derivative groups corresponding to the general structural formula $$-CO-N(R^1)-CH(R^2)-OR^3,$$

wherein
$R^1$ = a hydrogen atom or a $-CH(R^2)-OR^3$ group,
$R^2$ = a hydrogen atom or a $-COOR^4$ group,
$R^3$ = a hydrogen atom or a hydrocarbon radical of 1 to 10 carbon atoms, preferably the methyl, ethyl, (iso)propyl or (iso)butyl radical,
$R^4$ = an alkyl radical of 1 to 5 carbon atoms;

(B) 5 to 50% by weight, preferably 7 to 20% by weight, of a melamine resin dispersed or dissolved in an aqueous medium;

(C) 0 to 40% by weight, preferably 5 to 20% by weight, of a urea resin dispersed or dissolved in an aqueous medium;

(D) 5 to 30% by weight, preferably 6 to 15% by weight, of a polyol component; and (E) 0.01 to 5% by weight, preferably 0.1 to 1.5% by weight, of an amine component (A) to (E) adding up to 100% by weight; the curing component (II) consists of a water-dilutable acid and the components (I) and (II) are mixed prior to application in a ratio of 0.05 to 3 parts by weight, preferably 0.5 to 2 parts by weight, of the pure curing component (II) to 100 parts by weight of the paint component (I).

For the description of the components (A) to (E) to be used according to the invention and of the preferred embodiments, reference is made to the preceding discussion.

The coreactants are mixed in a ratio of 0.1 to 0.7, preferably 0.2 to 0.5 parts by weight of the melamine resin (B), 0 to 0.7, preferably 0.01 to 0.4 parts by weight of urea resin (C) and 0.01 to 0.7, preferably 0.01 to 0.4 parts by weight of the polyol component to 1 part by weight of the self-crosslinking polyacrylate resin (A) calculated as solids on solids.

The finishing sheeting and continuous edging are painted using machinery specially developed for this purpose. Screen rollers or wire coaters are available as the equipment for paint application and paint quantity control. For a wet film thickness of 10 to 80 μm, the amount of paint applied is usually between 5 and 50 g/m². Channel dryers with heated air, so-called convectors or IR radiators, or combinations of the two or hot rollers (calenders) are usually employed for drying the paint. After drying, the continuous length of the paper is coiled into a roll and is in this format delivered to the furniture industry.

The paint component (I), described in the foregoing, may be also pigmented, in which case either the various pigments are ground together with the binder or the component (I) is used as a paint component to be added to an aqueous pigment paste. Titanium dioxide is preferably used as the pigment.

It is much more difficult to produce surfaces which exhibit high abrasion resistance as low as possible metal abrasion, and attain the resistance values specified in group A of DIN 68861 and exhibit no swelling phenomena pigmented systems than unpigmented systems.

Thus, for example, the surface properties especially metal abrasion properties—of coatings produced, for example, from water-dilutable paints containing acid-curing melamine and/or urea resins as binders, become more and more impaired as the pigment content, i.e. the covering power, increases. Coatings of this type possessing high covering power therefore exhibit good surface properties only when coated with a coat of protective clear paint. The application of a second protective coat of clear paint, however, causes disadvantages in that an additional operation is necessary in the production of finishing sheeting and continuous edging and, in comparison with the one-coat process, the sheeting manufacturer has to purchase much larger and hence more expensive stocks of paint.

In addition, paints based on acid-curing melamine and/or urea resins suffer the disadvantage that they evolve comparatively large amounts of formaldehyde during and after processing.

The pigment content varies a good deal depending on the desired covering power and the pigment, and can be between 0.1 to 50% by weight, preferably between 5 and 40% by weight, based on the total weight of the paint component (I) a pigment content between 7 and 30% by weight being particularly preferred.

The average person skilled in the art can identify the optimum pigment content for each case with the aid of simple routine experiments.

The pigments used can be all inorganic and organic pigments which are both water-wettable and do not sublimate at the temperatures employed and which do not alter in color under the process and pH conditions used.

Examples of suitable pigments are titanium dioxide of the rutile type, yellow, red and black iron oxides, carbon black and phthalocyanins, titanium dioxide being the preferred pigment.

A particularly great advantage of the paint systems according to the invention lies in the fact that they can be pigmented with an amount of pigment necessary to achieve high covering power and produce surfaces with such excellent properties even when the more severe press conditions have been employed, that the application of a protective clear paint becomes unnecessary.

Thus the surfaces produced with the paint systems according to the invention possess metal abrasion properties and abrasion resistance values that can otherwise be achieved only with two-coat applied systems (pigmented base paint, protective clear paint). The metal abrasion properties can be readily evaluated with the aid of a so-called ring test. In this test a ring made from, for example, platinum, is moved several times across the surface under test. If a mark is left behind which cannot be readily removed by gentle wiping with a cloth, the surface has poor metal abrasion properties.

The paint systems according to the invention produce surfaces with good metal abrasion properties and abrasion resistance values.

Sheeting and furniture manufacturers are endeavouring to use finishing sheeting with better surface qualities, preferred in the kitchen furniture industry, in place of the previously used laminates. The laminates suffer from the disadvantage of plastics-like surface and of dirtying by fingerprints. Furthermore, laminates cannot be processed from the roll.

The sheeting paints according to the invention place the sheeting and furniture manufacturers in a position of manufacturing high-resistant finishing sheeting and use it in the desired furniture ranges.

Thanks to the paints according to the invention, formaldehyde emission during the application and drying is limited. Evolution of formaldehyde from a sheeting glued to an E1 chipboard should not be worse than that required by emission class E1 (≦0.1 ppm). The simultaneous use of polyols makes available sheeting paints that are low in condensation resins.

The mix ratios usually recommended for combinations of dispersions with, for example, melamine resins are from 90:1 to 70:30, calculated as solids on solids. By a proportionate addition of polyols the paint solids increase and the proportion of condensation resins which determines formaldehyde emission decreases.

The proportions of solids in the paints according to the invention lie between 50 and 60%, as can be also seen from the examples below. The requirements of group A of DIN 68 861 and the usually more stringent requirements of the American and Scandinavian markets are met at the same time.

The invention is illustrated in greater detail by the application examples below:

EXAMPLES FOR THE COMPONENT (I)

All the amounts stated refer to 100 parts of the component (I).

(I)-1

38.5% by weight of a self-crosslinking acrylate dispersion containing methylolamide groups with a solids content of 40% by weight, a mean particle diameter of 0.1 μm, a pH greater than 7 and a viscosity below 1,000 mPas are mixed with 37% by weight of a self-crosslinking acrylate dispersion containing methypolamide groups with a solids content of 50% by weight, a mean particle size diameter of 0.2 μm, a viscosity of below 500 mPas and a pH of 2-4. To this mixture there are added 5% by weight of a 35% polyethylene wax dispersion, 1% by weight of silicon dioxide as matting agent, 0.8% by weight of a mineral oil-containing antifoam, 1.2% by weight of a film-former based on a phosphoric acid ester derivative in combination with propanediol, 16.5% by weight of a hexamethoxymethylmelamine resin and 1% by weight of dimethylethanolamine.

(I)-2

0.5% by weight of a thixotropy agent based on a polyacrylate, 4% by weight of a 35% polyethylene wax dispersion, 1% by weight of silicon dioxide as matting agent, 1.2% by weight of film-former based on a phosphoric acid derivative in combination with propanediol, 0.6% by weight of a mineral oil-containing antifoam, 83.7% by weight of a self-crosslinking acrylate dispersion containing methylolamide groups with a solids content of 40% by weight, a mean particle diameter of 0.1 μm, a pH greater than 7 and a viscosity below 1,000 mPas, and 0.5% by weight of aminomethyl-1,3-propanediol are added to 8.5% by weight of a hexamethoxymethylmelamine resin with stirring.

(I)-3

0.5% by weight of a thixotropy agent, 4% by weight of a wax dispersion, 1% by weight of a matting agent, 1.2% by weight of a film-former, 10% by weight of an ethoxylated and propoxylated derivative of trimethylolpropane, 0.6% by weight of an antifoam, 73.8% by weight of a self-crosslinking acrylate dispersion, 0.5% by weight of aminomethylpropanol and 0.4% by weight of a polysiloxane derivatives are added to 8% by weigh of a hexamethoxymethylmelamine resin with stirring, as described in (I)-2.

(I)-4

7.3% by weight of a hexamethoxymethylmelamine resin are mixed with 1% by weight of a matting agent, 1.2% by weight of a film-former, 18% by weight of trimethylolpropane, 0.5% by weight of a thixotropy agent, 4% by weight of a wax dispersion, 0.6% by weight of an antifoam solution, 66.5% by weight of a self-crosslinking acrylate dispersion as described under (I)–2, 0.5% by weight of aminomethyl-propanol and 0.4% by weight of a water-dilutable polysiloxane.

(I)-5

This mix is carried out as described under (I)–4, except that 9% by weight of trimethylolpropane are replaced by 9% by weight of a plasticized urea resin.

(I)-6

6.5% by weight of a hexamethoxymethylmelamine resin are mixed with 0.5% by weight of a polyacrylate thickener, 3.3% by weight of a polyethylene wax dispersion, 1% by weight of silicon dioxide as matting agent, 1% by weight of a film-former based on phosphoric acid ester and 1,3-propanediol, 8.3% by weight of trimethylolpropane, 16.5% by weight of a urea resin, 0.6% by weight of a mineral oil-containing antifoam, 61.5% by weight of a self-crosslinking acrylate dispersion as described under (I)–2, 0.5% by weight of dimethylethanolamine and 0.3% by weight of a polysiloxane.

(I)-7

78.1% by weight of a self-crosslinking acrylate dispersion containing methylolamide groups with a solids content of 40% by weight, a mean particle diameter of 0.1 μm, a pH greater than 7 and a viscosity below 1,000 mPas are mixed with 0.25% by weight of an acrylate thickener, 13.5% by weight of a water-dilutable or emulsifiable hexamethoxymethylmelamine resin, 4.6% by weight of an aqueous polyethylene wax dispersion, 1% by weight of a matting agent, 1.2% by weight of a film-former, 0.6% by weight of an antifoam and 0.5% by weight of aminomethylpropanol with stirring.

(I)-8

12% by weight of a hexamethoxymethylmelamine resin are mixed with 0.25% by weight of an acrylate thickener, 4.5% by weight of a polyethylene wax dispersion, 1% by weight of a matting agent, 1.2% by weight of a filmformer, 9% by weight of an ethoxylated or propoxylated trimethylolpropane derivative, 0.6% by weight of an anti-foam, 70.4% by weight of an acrylate dispersion as described under (I)—7, 0.5% by weight of aminomethylpropanol and 0.4% by weight of a polysiloxane derivative with stirring.

(I)-9

11% by weight of a hexamethoxymethylmelamine resin are mixed with 64% by weight of an acrylate dispersion as described under (I)—7, the customary additives, 9% by weight of a plasticized urea resin and 8% by weight of trimethylolpropane with stirring.

(I)-10

10% by weight of a hexamethoxymethylmelamine resin are mixed with 59% by weight of a self-crosslinking dispersion, 16% by weight of a plasticized urea resin, 7% by weight of trimethylolpropane and the additives described above with stirring.

The component (II) consists of an aqueous solution of an acid. 50% by weight of PTS pre-diluted with 50% by weight of water are preferred. (PTS=p-toluenesulfonic acid).

The table below lists a few data relating to the paints according to the invention.

TABLE

|  | (I)-1 | (I)-2 | (I)-3 | (I)-4 | (I)-5 | (I)-6 | (I)-7 | (I)-8 | (I)-9 | (I)-10 |
|---|---|---|---|---|---|---|---|---|---|---|
| Viscosity of mix (DIN 4) | 80 sec. | 84 sec. | 32 sec. | 36 sec. | 35 sec. | 22 sec. | 75 sec. | 32 sec. | 25 sec. | 23 sec. |
| pH (I) | 9.6 | 9.1 | 9.1 | 9.3 | 9.0 | 8.3 | 9.2 | 8.9 | 8.9 | 8.7 |
| Amount of component (II)* | 1.2% | 1.2% | 1.2% | 1.2% | 1.2% | 1.2% | 1.2% | 1.2% | 1.2% | 1.2% |
| pH•(I) + (II) | — | 6.1 | 6.4 | — | — | — | 5.7 | 5.1 | 4.9 | 5.9 |
| Pot life (days) | >90 | >15 | >15 | >5 | >5 | >30 | >17 | >17 | >17 | >17 |
| Abrasion resistance*** | 2 | 0–1 | 1 | 0–1 | 0–1 | 1–2 | 0 | 0 | 0 | 0–1 |
| Coffee test (24 hours)*** | 1–2 | 1 | 0 | 0–1 | 0 | 1 | 0–1 | 1 | 0 | 0–1 |
| Mustard test (24 hours)*** | 1–2 | 1 | 0–1 | 1 | 0–1 | 1 | 1 | 1 | 0–1 | 1 |
| Water column (24 hours)*** | 2 | 1 | 0–1 | 2 | 0 | 1–2 | 0 | 0–1 | 0 | 1 |
| Solids | 50.4 | 42.0 | 47.5 | 51.9 | 51.9 | 55.9 | 44.7 | 49.2 | 53.6 | 56.6 |
| Formaldehyde emission** in accordance with DIN 52 368 (mg/h m²) | 1.8 | 1.8 | 1.5 | 1.3 | 0.6 | 2.2 | 2.0 | 1.8 | 1.5 | 0.6 |

*Solid PTS to 100% by weight of the component (I)
**E 1 chipboard, urea adhesive, weight of paper 100 g/m², amount of paint applied 30 μm wet
***0 = very good  5 = defective

I claim:

1. An aqueous, two component paint for one-coat coating of finishing sheeting and continuous edging, which comprises: paint component (I) containing
   (A) 40 to 85% by weight of an aqueous dispersion of a self-crosslinking polyacrylate resin which contains as groups capable of bringing about self-crosslinking, acid amide derivative groups having the general structural formula

   —CO—N(R¹)—CH(R²)—OR³, wherein
   R¹ = a hydrogen atom or a —CH(R²)—OR³ group,
   R² = a hydrogen atom or a —COOR⁴ group,
   R³ = a hydrogen atom or a hydrocarbon radical of 1 to 10 carbon atoms and R⁴ = an alkyl radical of 1 to 5 carbon atoms;
   (B) 5 to 50% by weight of a melamine resin dispersed or dissolved in an aqueous medium;
   (C) 5 to 40% by weight of a urea resin dispersed or dissolved in an aqueous medium;
   (D) 5 to 30% by weight of a polyol component; and
   (E) 0.01 to 5% by weight and a
   curing component (II) comprising water-dilutable acid, components (I) and (II) being mixed prior to application in a ratio of 0.05 to 3 parts by weight of the curing component (II) to 100 parts by weight of the paint component (I).

2. A process for one-coat coating of finishing sheeting and continuous edging, wherein the finishing sheeting and continuous edging are coated with an aqueous two-component paint and wherein the wet film is subsequently cured for 10 to 60 seconds at 140° to 210° C., comprising: applying a coating containing a paint component (I) which contains:

(A) 40% to 85% by weight of an aqueous dispersion of a self-crosslinking polyacrylate resin which contains as the groups capable of bringing about self-crosslinking, acid amide derivative groups having the general structural formula —CO—N(R$^1$)—CH(R$^2$)—OR$^3$, wherein R$^1$ = a hydrogen atom or a —CH(R$^2$)—OR$^3$ group, R$^2$ = a hydrogen atom or a —COOR$^4$ group, R$^3$ = a hydrogen atom or a hydrocarbon radical of 1 to 10 carbon atoms and R$^4$ = an alkyl radical of 1 to 5 carbon atoms;

(B) 5 to 50% by weight of a melamine resin dispersed or dissolved in an aqueous medium;

(C) 0 to 40% by weight of a urea resin dispersed or dissolved in an aqueous medium;

(D) 5 to 30% by weight of a polyol component; and (E) 0.01 to 5% by weight of an amine component, (A) to (E) adding up to 100% by weight; and a curing component (II) comprising a water-dilutable acid, components (I) and (II) being mixed prior to application in a ratio of 0.05 to 3 parts by weight of the curing component (II) to 100 parts by weight of paint component (I).

3. A paint or process as claimed in claims 1 or 2, wherein 2-amino-2-ethyl-1,3-propanediol or 2-amino-2-methylpropanol is used as the amine component (E).

4. A paint or process as claimed in claims 1 or 2 wherein trihydric polyols are used as the polyol component (D).

5. A paint or process as claimed in claims 1 or 2 wherein p-toluenesulfonic acid is used as the water-dilutable acid.

6. An aqueous, two-component paint of claim 1 wherein the aqueous dispersion of self-crosslinking polyacrylate resin of part (A) is present in an amount ranging from 60 to 85% by weight based on the total weight of component (I).

7. The aqueous, two-component paint of claim 1 wherein R$^3$ is methyl, ethyl, isopropyl or isobutyl.

8. The aqueous, two-component paint of claim 1 wherein the melamine resin of part (B) is present in an amount ranging from 7 to 20% by weight based on the weight of component (I).

9. The aqueous, two-component paint of claim 1 wherein the urea resin (C) comprises 5 to 20% by weight based on the weight of component (I).

10. The aqueous, two-component paint of claim 1 wherein the polyol component (D) is 6 to 15 percent by weight based on the weight of component (I).

11. The aqueous, two-component paint of claim 1 wherein the amine component (E) is 0.1 to 15% by weight based on the weight of component (I).

12. The aqueous, two-component paint of claim 1 wherein components (I) and (II) are mixed in a ratio of 0.5 to parts (II) to 100 parts (I).

13. A process of claim 2 wherein the set film is cured for 10 to 20 seconds.

14. The process of claim 2 wherein part (A) comprises 60 to 85% by weight of component (I).

15. The process of claim 2 wherein R$^3$ is methyl, ethyl, isopropyl or isobutyl.

16. The process of claim 2 wherein part (B) comprises 7 to 20% by weight of component (I).

17. The process of claim 2 wherein part (C) comprises 5 to 20% by weight of component (I).

18. The process of claim 2 wherein part (D) comprises 6 to 15% by weight of component (I).

19. A process of claim 2 wherein part (E) comprises 0.1 to 1.5% by weight based on component (I).

20. A process of claim 2 wherein 0.5 to 2 parts by weight of component (II) are mixed with 100 parts by weight of component (I).

* * * * *

UNITED STATES PATENT AND TRADEMARK OFFICE
CERTIFICATE OF CORRECTION

PATENT NO. : 4,940,841
DATED      : July 10, 1990
INVENTOR(S): Karl-Heinz Dickerhof It is certified that error appears in the above-identified patent and that said Letters Patent is hereby corrected as shown below:

Column 7, line 17-18, change "water-diluting" to --water-dilutable--

Column 12, line 47, claim 1, change "$COOOR^4$ group" to read --$COOR^4$ group--

Column 14, line 20, claim 12, change "to parts (II)" to --to 2 parts (II)-- line 21, claim 12, change "the set film" to --the wet film--

Signed and Sealed this

Fourteenth Day of July, 1992

Attest:

DOUGLAS B. COMER

Attesting Officer    Acting Commissioner of Patents and Trademarks